United States Patent Office 2,809,732
Patented Oct. 15, 1957

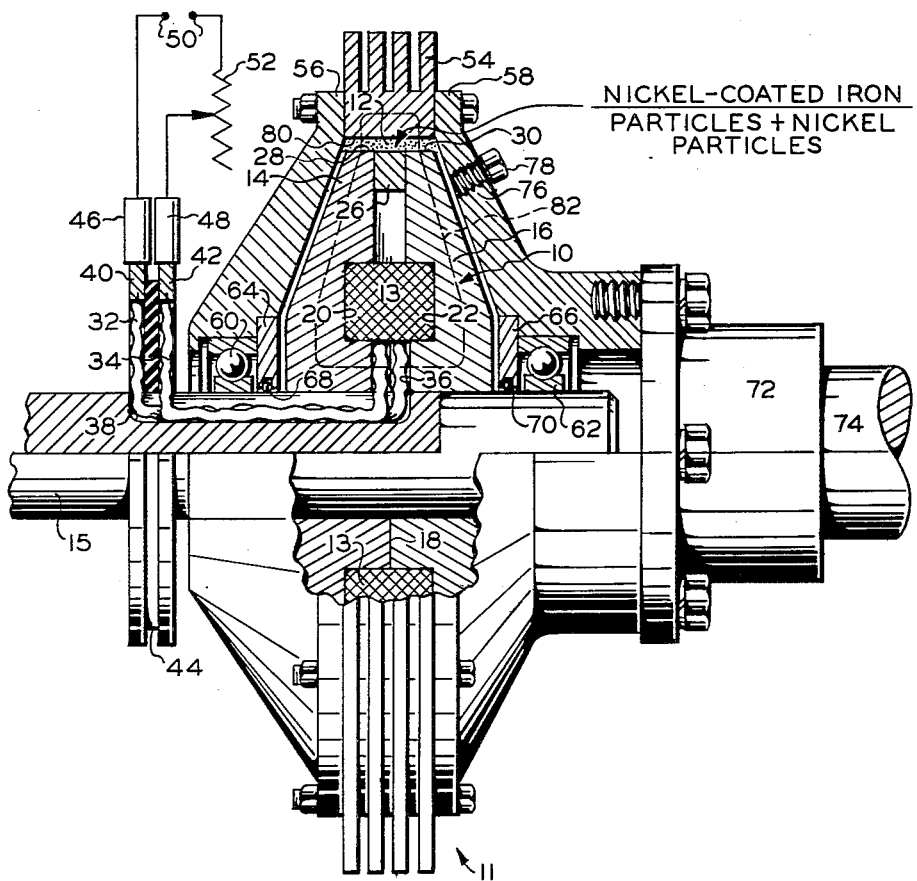

2,809,732

MAGNETIC PARTICLE COUPLING DEVICE WITH NICKEL AND NICKEL-COATED IRON PARTICLES

Frank G. Logan and David W. Rau, Kirkwood, Mo., assignors to Vickers Incorporated, Detroit, Mich., a corporation of Michigan Application November 16, 1950, Serial No. 196,060

7 Claims. (Cl. 192—21.5)

The invention relates to power transmission and more particularly to power transmission by magnetic coupling through the medium of magnetic particles.

The invention herein is concerned with the type of magnetic coupling provided between two relatively movable spaced coupling members separated by a gap in which magnetic particles act to transmit mechanical force between the coupling members when the gap material (magnetic particles) is magnetically excited. Magnetic clutches, brakes, drives, etc., are examples of the use of this type of magnetic coupling.

Since one of the limiting factors of any coupling device, such as a clutch, brake, or drive, is the amount of heat it can successfully dissipate, it is desirable that material in the gap of a magnetic coupling device have a high thermal conductivity in order to effectively transfer heat across the gap to the exterior of the device. Other characteristics desirable to have in a gap material are as follows: smooth application and transmission of force; reasonably high permeability in order to transmit force with the least amount of control current; resistance to packing and sintering either of which may prevent power transmission or cause the coupling members to seize depending on the volume of the gap material; chemical and magnetic stability over a reasonable period of time.

Prior to the invention herein, iron particles were the only magnetic particles which achieved any practical success as gap material in magnetic coupling devices. Iron particles, known commercially as Carbonyl E, which are spongy particles of the order of eight microns, have been extensively used in such devices. However, iron particles alone cannot be used in magnetic coupling devices because they pack and sinter after a short time. For example, in a clutch iron particles alone, such as Carbonyl E without any additive, produce high initial torque for only a short time before the particles sinter or pack into a mass which will cause either complete failure of torque transmission or locking of the coupling members. What happens depends largely on the proportion of the gap material to the gap volume.

Several proposals made in the past have retained the use of iron particles while alleviating to some degree the sintering and packing problems. These proposals involve mixes of iron particles with either liquid or solid lubricants such as oils, silicone fluids, graphite, etc., all of which brought their own special problems and disadvantages.

Both liquid and solid lubricants possess no magnetic characteristics and consequently when mixed with iron dilute the permeability and magnetic effectiveness of the iron on a volume basis. A mixture of iron particles and the lubricant, either liquid or solid, necessarily has much lower permeability than an equivalent volume of iron particles without the additive. In rotary applications employing liquid mixtures with iron particles, packing is often caused by centrifuging, resulting in some loss of torque in many cases. An added disadvantage is the liquid sealing problem encountered with mixtures of iron particles and liquids. Graphite and other solid lubricants have such a low thermal conductivity that the heat transfer across the magnetic gap is very poor when the gap material is a mixture of iron particles and a solid lubricant, thereby limiting the power that can be dissipated by a device of a particular size.

The present invention contemplates the use of iron particles in a gap mixture that will not sinter or pack under operating conditions and which does not require either liquid or solid lubricants. This is accomplished in accordance with the invention by applying a nickel coat to the iron particles and mixing these particles with nickel particles. Thus the present invention embraces the use of nickel-coated iron particles mixed with nickel particles as a gap material in connection with magnetic coupling devices.

An object of this invention is to provide a new and useful magnetic coupling device wherein the gap material has substantially the following characteristics: reasonable permeability to allow effective application and transmission of force with reasonable magnetic excitation; resistance to sintering and packing under operating conditions; high thermal conductivity; freedom from sealing problems like those encountered with liquid mixtures; chemical and mechanical stability for a reasonably long period of time.

Further objects and advantages of the present invention will be apparent from the following description reference being had to the accompanying drawing wherein a preferred form of the present invention is clearly shown.

In the drawing:

The single figure in the drawing is a view partly in cross section illustrating the use of the invention as embodied in an electro-magnetic clutch.

Within the sphere of the invention the coupling members may adopt various forms of construction; the gaps therebetween may be single or compound and of any suitable form, e. g. in rotary applications the gaps may be radial, axial, or combinations of both; the magnetic excitation across the gaps between the coupling members may be provided in a variety of ways, such as fixed magnets with or without variable shunt control, current carrying magnetizing coils etc., any of which may be carried by any of the coupling members, by a yoke independent of the coupling members, or any other suitable manner; and any of the coupling members may be employed either as force transmitting or force receiving members.

In accordance with one embodiment of the invention, shown in the drawing by way of example and not as limiting the invention or the scope thereof, a magnetic clutch includes a pair of relatively movable coupling members 10 and 11 separated by a magnetizable air gap 12 in which is disposed a quantity of nickel particles and nickel-coated iron particles as indicated by the legend in the drawing. Magnetic excitation between the members 10 and 11 across the gap 12 is provided by a magnetizing coil 13 carried by the member 10 as later described. The member 10, which is completely surrounded by the member 11, is fixed to a shaft 15 and includes a magnetic yoke made of two disks 14 and 16 made of suitable magnetic material, for example, steel or iron. Central sections of the disk surrounding shaft 15 abut each other as indicated at 18 to form a low reluctance joint, and annular grooves 20 and 22 are formed in the disks to receive the magnetizing coil 13.

The disks are spaced apart from their outer diameter to the grooves 20 and 22, and the gap between them is sealed by a nonmagnetic ring spacer 26 flush with the peripheral surfaces 28 and 30 of the disks, which surfaces are the pole faces of the magnetic yoke. It will be seen from the figure that the cross section of the yoke is generally U-shaped, the "legs" being the spaced sides of the disks 14 and 16 whose abutting sections form the base of the U. Thus, when the yoke is magnetized upon energization of the coil, an infinite number of horseshoe magnets form a volume of revolution around the shaft 15.

Leads 32 and 34 from the coil 13 are brought out through a small opening 36 at the joint 18 and an axial slot 38 in the shaft 15, and are connected to a pair of slip rings 40 and 42 mounted on an insulator disk 44 fixed to rotate with the shaft 15. A pair of brushes 46 and 48 contacting the rings 40 and 42, respectively, may be connected to a suitable source 50 of control current through a rheostat 52. The path of control current to the magnetizing coil 13 is obvious from the figure.

The member 11 includes a finned ring 54 formed from suitable magnetic material, such as, iron or steel, and carried by non-magnetic end bells 56 and 58 mounted on ball bearings 60 and 62 for rotation around the shaft 15. Bearing retaining rings 64 and 66 may be provided with suitable seals 68 and 70 to prevent the escape of magnetic particles from the clutch interior to the bearings. A flanged union 72 secured to the end bell 58 provides coupling means to shaft 74 which may be keyed to the union 72 in any suitable manner. A suitable filler hole 76 and plug 78 are provided in the end bell 58 to permit the introduction of the magnetic particles into the interior of the clutch.

Either of the members 10 and 11 may be interchangeably employed as a driver or a driven member, for example if the inner member 10 is connected through shaft 15 to a prime mover then the outer member 11, together with the shaft 74, become the output members of the clutch. Suitable labyrinth mazes, or baffles may be provided if desired between the coupling members to prevent the gap material from falling or working toward shaft portions of the apparatus and to keep the particles close to the gap when the members are at standstill or at slow speed and the coil 13 is de-energized.

Finely divided nickel is obtainable commercially as nickel powder and may be made by any suitable method; for example, by the Schoup metalizing process, which is a form of metal spraying that produces "atomized" nickel which may be conveniently collected by aiming the spray into a cardboard box.

Although any type of magnetic iron particles may be used in the practice of the invention, magnetic iron particles commercially known as Carbonyl E, Carbonyl L, and Kurt-Orban S3 are preferred forms. For use in practicing the invention the iron particles may be coated with nickel by any suitable method, for example by plating. One plating method which was used to coat nickel on iron particles employed in the practice of the present invention is known as the electroless plating method.

A particular mixture which worked very satisfactorily as gap material in the practice of the invention comprised equal parts by weight of nickel particles of an order less than 54 microns (pass through 270 sieve) and nickel-coated Kurt-Orban S3 iron particles of about the same order. This example is merely illustrative, and the ratio of the components and relative sizes of the particles may be varied as desired. The type of duty and the nature of the coupling device are factors which are necessarily considered in determining the size of the particles, their respective proportions, and the quantity thereof with relation to the gap volume that will be used.

When the coil 13 is energized by current, a magnetic field is established between the peripheral surfaces 28 and 30 of the magnetic yoke and the inner surface 80 of the magnetic ring 54. The magnetic path is indicated by the dotted line 82 which traverses the air gap through the magnetic particles. The magnetic particles and the magnetic members 14, 16, and 54 become magnetized when the magnetic field is established and the magnetized particles bind the driving and the driven member together to an extent dependent on the strength of the field and the load. Operative ranges from substantially 100% slip to zero slip (synchronous operation) between the coupling members is available through control of the magnetic excitation. For use as a brake, one of the movable members may be held rigid. For example, the member with the coil may be stationary and utilized to brake the rotating member 11.

Magnetic particle clutches employing a mixture of nickel-coated iron particles and nickel particles have been successfully operated continuously for many hours without sintering, packing, wear, or deterioration of the magnetic stability taking place.

Although, only one embodiment has been illustrated, the invention is applicable wherever a magnetic coupling is required between spaced magnetic members, such as, magnetic clutches, brakes, etc. Further, the invention is not confined to rotating machinery but is equally adaptable as a coupling between magnetic members, relatively movable in other than rotative paths, for example, rectilinear motion, etc.

While the form of embodiment of the invention as herein disclosed constitutes a preferred form, it is to be understood that other forms might be adopted, all coming within in the scope of the claims which follow.

What is claimed is as follows:

1. Means for establishing a connection to transmit mechanical force from one to another of a pair of spaced relatively movable coupling members defining a gap therebetween, said means comprising means for establishing a magnetic field across said gap and a dry particle mixture including discrete nickel-coated iron particles and discrete nickel particles disposed in said gap and effective, in response to magnetic excitation, to establish a connection for transmitting mechanical force between said coupling members.

2. A gap material for magnetic coupling devices consisting essentially of an unlubricated mixture of substantial proportions of discrete nickel-coated iron particles and discrete nickel particles.

3. Means for forming a force-transmitting bond between a pair of spaced relatively movable coupling members defining a gap therebetween, said means comprising means for establishing a magnetic field across said gap and unlubricated magnetic particles in said gap and responsive to said field for establishing a force-transmitting bond between said members whereby movement of one member at least tends to cause movement of the other member, said magnetic particles consisting essentially of substantial proportions of discrete nickel-coated iron particles and discrete nickel particles.

4. A magnetic coupling device comprising a pair of spaced relatively movable coupling members defining a gap therebetween, means for establishing a magnetic field between said members at said gap, and unlubricated magnetic particles in said gap and responsive to said field for establishing a force transmitting bond between said members, whereby movement of one member at least tends to cause movement of the other member, said magnetic particles including discrete nickel-coated iron particles and discrete nickel particles.

5. A magnetic coupling device comprising a pair of spaced relatively rotatable coupling members defining a gap therebetween, means for establishing a magnetic field across said gap, and dry particles in said gap and responsive to said field for establishing a force-transmitting bond between said members, whereby rotation of one member at least tends to cause rotation of the other member, said particles consisting essentially of discrete nickel-coated iron particles and discrete nickel particles.

6. Means for forming a force-transmitting bond between a pair of spaced relatively rotatable coupling members defining a gap therebetween, said means comprising means for establishing a magnetic field across said gap and unlubricated magnetic particles in said gap and responsive to said field for establishing a force transmitting bond between said members whereby rotation of one member at least tends to cause rotation of the other member, said magnetic particles consisting essentially of substantial proportions of discrete nickel-coated iron particles and discrete nickel particles.

7. A magnetic coupling device comprising a pair of spaced relatively rotatable coupling members defining a gap therebetween, means for establishing a magnetic field between said members at said gap, and unlubricated magnetic particles in said gap and responsive to said field for establishing a force-transmitting bond between said members, whereby rotation of one member at least tends to cause rotation of the other member, said magnetic particles including discrete nickel-coated iron particles and discrete nickel particles.

References Cited in the file of this patent

UNITED STATES PATENTS

| | | |
|---|---|---|
| 711,123 | Rhoades | Oct. 14, 1902 |
| 1,915,386 | Schumacher et al. | June 27, 1933 |
| 1,986,197 | Harshaw | Jan. 1, 1935 |
| 2,519,449 | Findley | Aug. 22, 1950 |
| 2,525,571 | Winther | Oct. 10, 1950 |
| 2,575,360 | Rabinow | Nov. 20, 1951 |
| 2,596,654 | Clark et al. | May 13, 1952 |
| 2,629,471 | Rabinow | Feb. 24, 1953 |

FOREIGN PATENTS

| | | |
|---|---|---|
| 261,748 | Switzerland | Sept. 1, 1949 |

OTHER REFERENCES

Technical Report 1213, National Bureau of Standards, Washington, D. C., March 30, 1948.

Magnetic Clutch holds M. P. A. Interest; Chemical and Engineering News, vol. 27, No. 17, April 25, 1949.